US009605447B2

(12) United States Patent
Yano (10) Patent No.: US 9,605,447 B2
(45) Date of Patent: Mar. 28, 2017

(54) CYLINDER LOCKING DEVICE

(71) Applicant: KABUSHIKI KAISHA HONDA LOCK, Miyazaki-shi, Miyazaki (JP)

(72) Inventor: Hitoshi Yano, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 15/102,412

(22) PCT Filed: Nov. 12, 2014

(86) PCT No.: PCT/JP2014/079942
§ 371 (c)(1),
(2) Date: Jun. 7, 2016

(87) PCT Pub. No.: WO2015/087655
PCT Pub. Date: Jun. 18, 2015

(65) Prior Publication Data
US 2016/0312493 A1 Oct. 27, 2016

(30) Foreign Application Priority Data

Dec. 13, 2013 (JP) ................................. 2013-257628

(51) Int. Cl.
*E05B 29/00* (2006.01)
*B60R 25/04* (2013.01)
(Continued)

(52) U.S. Cl.
CPC ............ *E05B 29/006* (2013.01); *B60R 25/04* (2013.01); *E05B 15/14* (2013.01); *E05B 27/006* (2013.01);
(Continued)

(58) Field of Classification Search
CPC ... B60R 25/04; E05B 27/0021; E05B 27/006; E05B 27/0075; E05B 29/006; E05B 29/0013; E05B 15/14; E05B 29/00
(Continued)

(56) References Cited

U.S. PATENT DOCUMENTS 2,517,506 A * 8/1950 Riggs ...................... B60R 25/04
200/15
4,036,039 A * 7/1977 Nakanishi ............. E05B 13/108
292/111
(Continued)

FOREIGN PATENT DOCUMENTS

JP S63-58051 U 4/1988
JP 3675936 B2 7/2005
JP 2007-247154 A 9/2007

*Primary Examiner* — Suzanne Barrett
(74) *Attorney, Agent, or Firm* — Carrier Blackman & Associates, P.C.; William D. Blackman; Joseph P. Carrier (57) ABSTRACT

A cylinder locking device is provided in which an inner cylinder is pivotably inserted into a cylinder body, a protector is disposed opposite a rear end of the inner cylinder along an insertion direction of a mechanical key, the protector enabling the mechanical key to be inserted toward the inner cylinder, and a coil-shaped spring is provided between the protector and the inner cylinder or the cylinder body, wherein the spring is formed so as to have a coil portion that extends in the axial direction of the inner cylinder and a bent portion that is bent from at least one end part of the coil portion toward an interior of the coil portion in a direction along an axis of the inner cylinder. This enables deformation of a coil-shaped spring to be prevented.

5 Claims, 8 Drawing Sheets

(51) Int. Cl.
*E05B 15/14* (2006.01)
*E05B 27/00* (2006.01)

(52) U.S. Cl.
CPC ...... *E05B 27/0021* (2013.01); *E05B 27/0075* (2013.01); *E05B 29/00* (2013.01); *E05B 29/0013* (2013.01)

(58) Field of Classification Search
USPC .................................. 70/419–421, 454, 455
See application file for complete search history.

(56) References Cited

U.S. PATENT DOCUMENTS

| | | | | |
|---|---|---|---|---|
| 4,052,869 | A * | 10/1977 | Weber | B60R 25/02131 70/252 |
| 4,192,161 | A * | 3/1980 | Borlinghaus | E05B 17/185 70/452 |
| 5,070,716 | A * | 12/1991 | Whorlow | E05B 17/04 70/380 |
| 5,265,453 | A * | 11/1993 | Konii | E05B 17/04 70/360 |
| 5,640,864 | A * | 6/1997 | Miyamoto | E05B 17/0058 70/360 |
| 5,829,284 | A | 11/1998 | Yamashita et al. | |
| 6,523,382 | B1 * | 2/2003 | Dimig | C23C 16/455 70/419 |
| 7,401,484 | B1 * | 7/2008 | Holmes | E05B 13/10 292/336.3 |
| 8,474,290 | B2 * | 7/2013 | Terhaar | E05B 17/04 292/21 |
| 2004/0155525 | A1 * | 8/2004 | Ohtaki | B60R 25/04 307/10.5 |

\* cited by examiner

CYLINDER LOCKING DEVICE

TECHNICAL FIELD

The present invention relates to a cylinder locking device in which an inner cylinder is pivotably inserted into a cylinder body, a tumbler whose engagement with the cylinder body is released in response to a legitimate mechanical key being inserted is held by the inner cylinder, a protector is disposed opposite a rear end of the inner cylinder along an insertion direction of the mechanical key, the protector enabling the mechanical key to be inserted toward the inner cylinder, and a coil-shaped spring extending in an axial direction of the inner cylinder is provided between the protector and the inner cylinder or the cylinder body so as to exhibit a spring force urging the protector rearward along the insertion direction.

BACKGROUND ART

An arrangement in which, as a measure against theft or tampering with a vehicle by forcibly pushing an unauthorized key other than a legitimate mechanical key, a tool, etc. into an inner cylinder and pivoting it, a protector is disposed opposite the rear end of the inner cylinder along the insertion direction of the mechanical key is known from for example Patent Document 1.

RELATED ART DOCUMENTS

Patent Documents

Patent Document 1: Japanese Patent No. 3675936

SUMMARY OF THE INVENTION

Problems to be Solved by the Invention

In the arrangement disclosed in Patent Document 1 above, while making pivoting of the protector impossible by making it engage with the cylinder body when the protector is forcibly pushed in by means of a screwdriver, etc., the protector is urged rearward along the insertion direction of the mechanical key by means of a coil-shaped spring provided between the inner cylinder and the protector. When, due to one end part of the spring engaging with one of the protector and the inner cylinder, it pivots together with the protector and the inner cylinder, there is a possibility that the other end part of the spring will catch on the cylinder body, and there is thus a possibility that the spring will be deformed.

The present invention has been accomplished in light of such circumstances, and it is an object thereof to provide a cylinder locking device in which deformation of a coil-shaped spring provided between a protector and an inner cylinder or a cylinder body is prevented.

Means for Solving the Problems

In order to attain the above object, according to an aspect of the present invention, there is provided a cylinder locking device in which an inner cylinder is pivotably inserted into a cylinder body, a tumbler whose engagement with the cylinder body is released in response to a legitimate mechanical key being inserted is held by the inner cylinder, a protector is disposed opposite a rear end of the inner cylinder along an insertion direction of the mechanical key, the protector enabling the mechanical key to be inserted toward the inner cylinder, and a coil-shaped spring extending in an axial direction of the inner cylinder is provided between the protector and the inner cylinder or the cylinder body so as to exhibit a spring force urging the protector rearward along the insertion direction, characterized in that the spring is formed so as to have a coil portion that extends in the axial direction of the inner cylinder and a bent portion that is bent from at least one end part of the coil portion toward an interior of the coil portion in a direction along an axis of the inner cylinder.

Effects of the Invention

In accordance with the aspect of the present invention, since the bent portion, which is bent toward the interior of the coil portion in the direction along the axis of the inner cylinder, is formed on at least one end side of the coil-shaped spring that has the coil portion, even if the spring pivots together with the protector and the inner cylinder, at least one end side of the spring does not engage with the cylinder body, a force that will deform the spring does not act thereon, and it is possible to prevent the spring from being deformed.

EXPLANATION OF REFERENCE NUMERALS AND SYMBOLS

11 Cylinder body
12 Mechanical key
13 Inner cylinder
14 Insertion direction
15 Protector
22, 23 Tumbler
50, 58 Spring
50*a*, 58*a* Coil portion
50*b*, 58*b*, 58*c* Bent portion

MODES FOR CARRYING OUT THE INVENTION

Embodiments of the present invention are explained below by reference to the attached drawings.

First Embodiment

A first embodiment of the present invention is explained by reference to FIG. 1 to FIG. 7.

Figure 1:
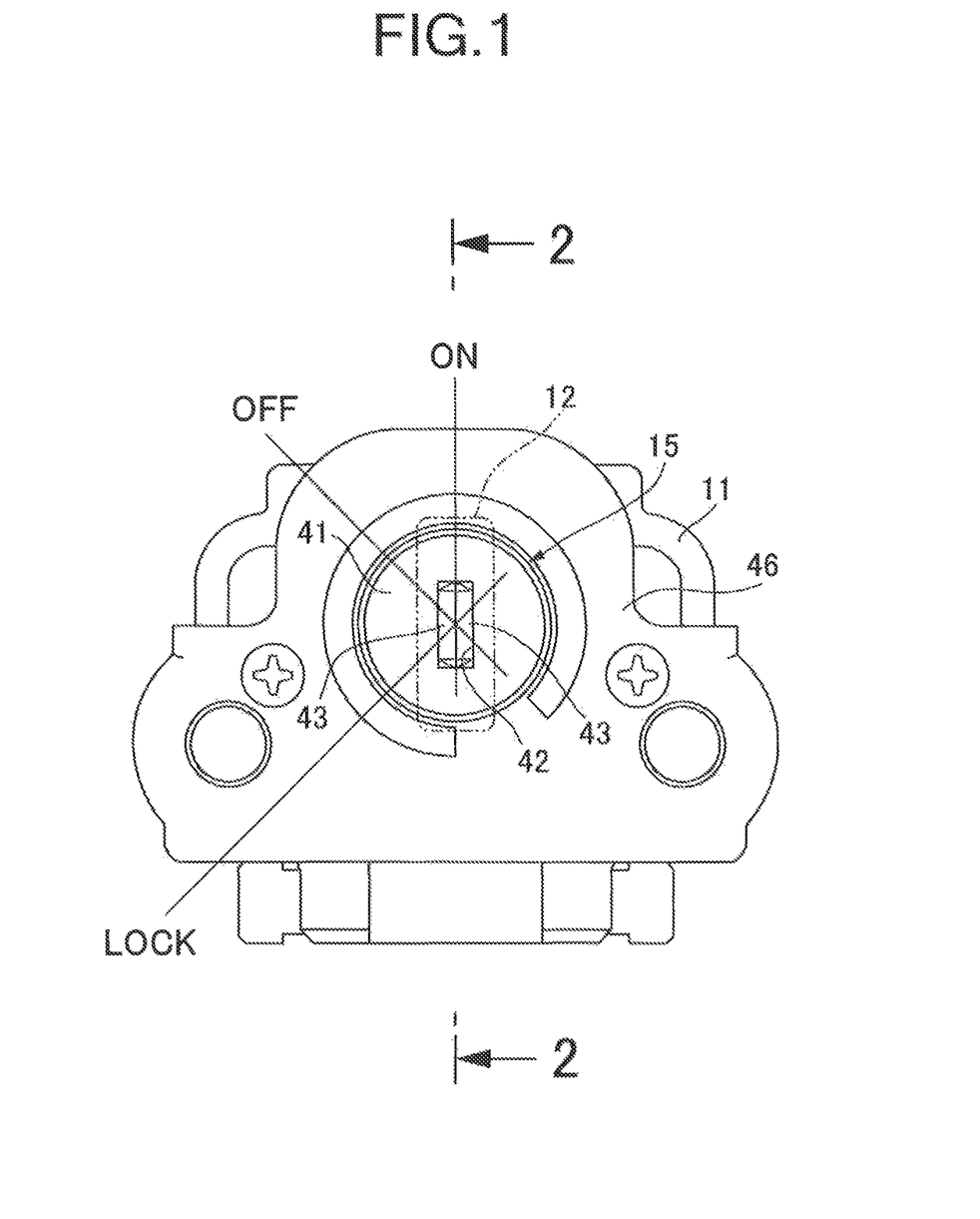
FIG. 1 is a front view of a cylinder locking device of a first embodiment. (first embodiment)
Figure 2:
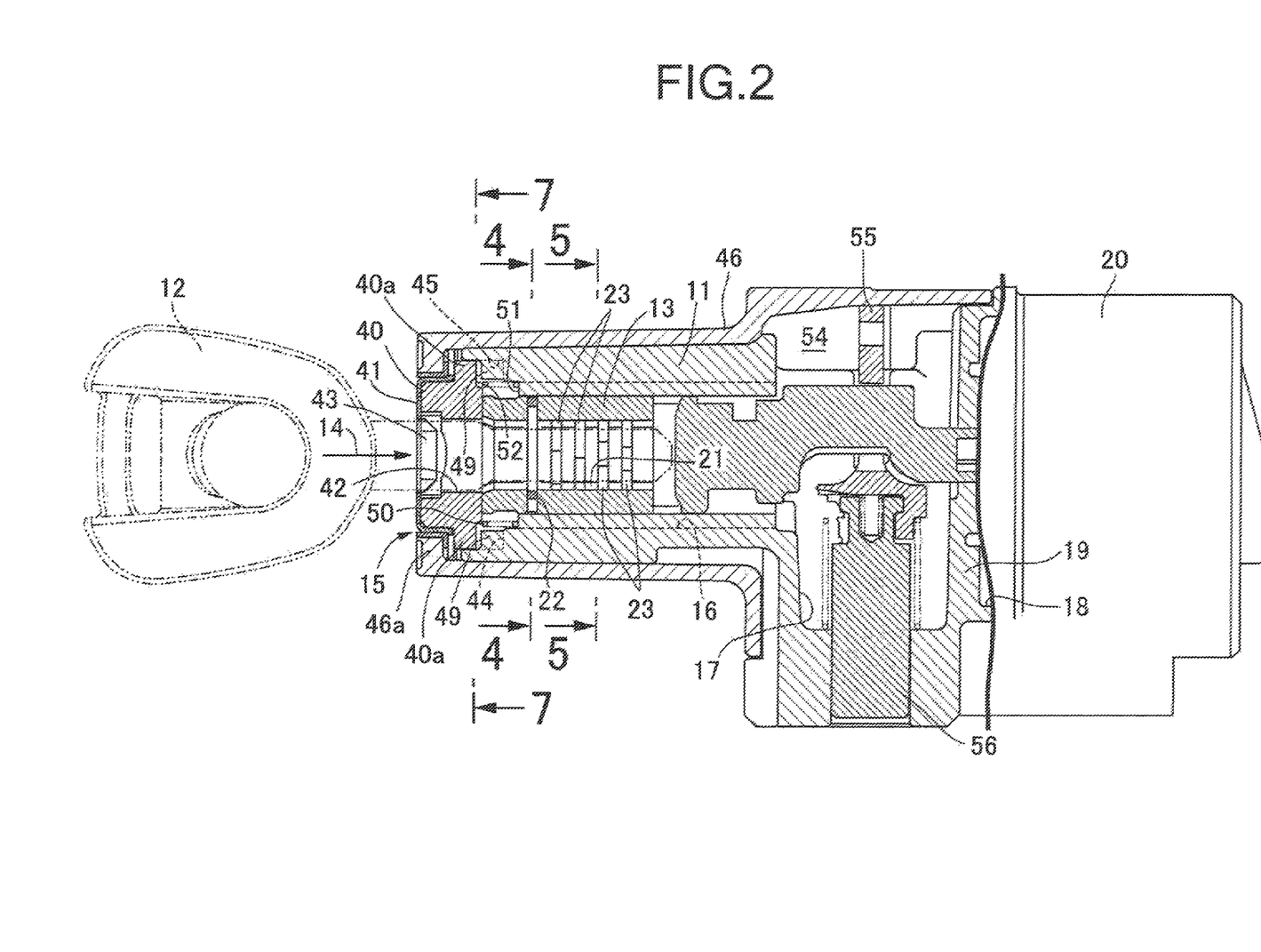
FIG. 2 is a sectional view along line 2-2 in FIG. 1. (first embodiment)

First, in FIG. 1 and FIG. 2, this cylinder locking device is used in a two-wheeled motor vehicle, etc. and is capable of switching the switching mode of an ignition switch (not illustrated) and switching steering between a locked state and an unlocked state; it includes a cylinder body 11 mounted on for example a head pipe (not illustrated) of the two-wheeled motor vehicle, an inner cylinder 13 that is pivotably inserted into the cylinder body 11 so that it can occupy in turn a LOCK position, an OFF position, and an ON position provided that when pivoting between the LOCK position and the OFF position it is accompanied by being pushed by means of a legitimate mechanical key 12, and a protector 15 that is disposed opposite the rear end of the inner cylinder 13 along an insertion direction 14 of the mechanical key 12 so that the mechanical key 12 can be inserted to the inner cylinder 13 side.

Figure 3:
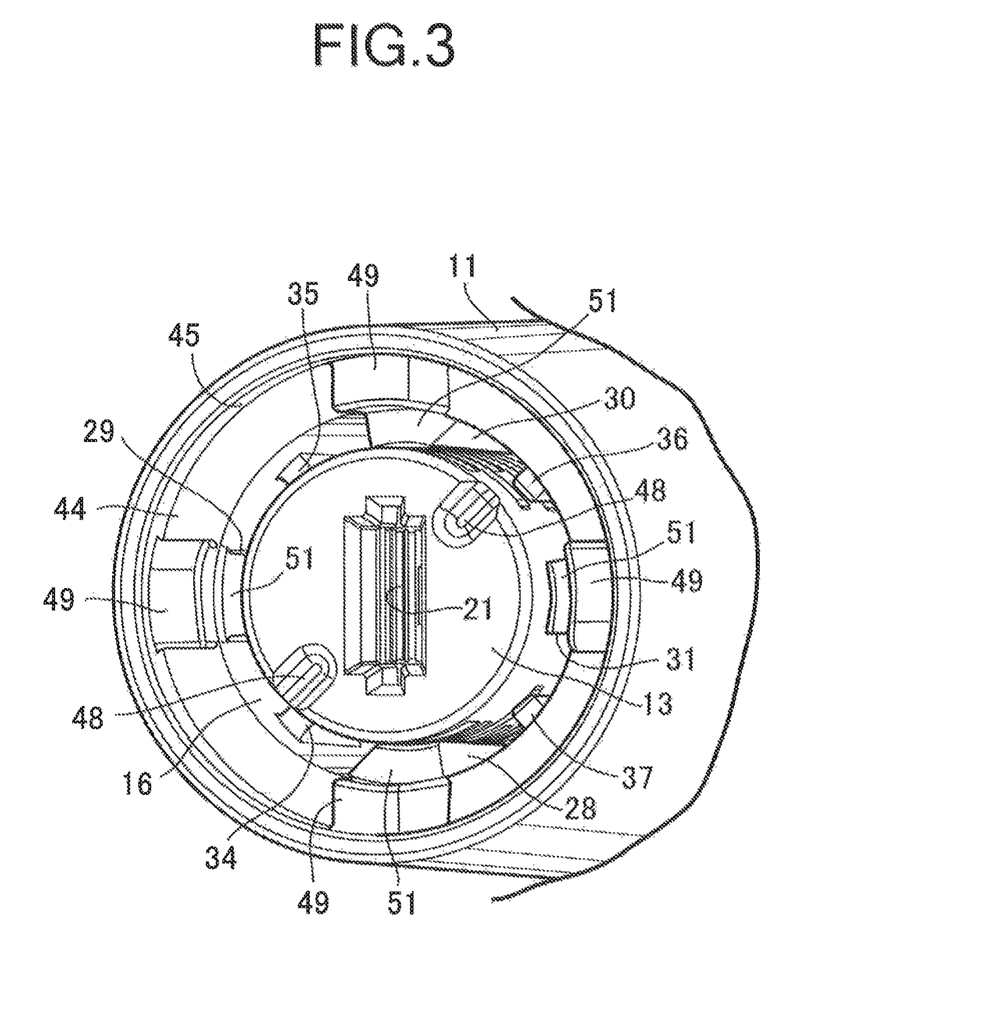
FIG. 3 is a perspective view showing part of a cylinder body and an inner cylinder. (first embodiment)

Referring in addition to FIG. 3, provided in the cylinder body 11 are an inner cylinder insertion hole 16 having one end opening at the rear end (left end of FIG. 2) of the cylinder body 11 along the insertion direction 14, a housing recess 17 opening on a side face of the cylinder body 11 and communicating with the other end of the inner cylinder insertion hole 16, and a bottomed switch housing hole 18 opening at the other end (right end of FIG. 2) of the cylinder body 11 while having a partition wall 19 disposed between itself and the housing recess 17.

The ignition switch is housed in the switch housing hole 18, this ignition switch being covered with a switch cover 20 assembled on the cylinder body 11. Furthermore, the inner cylinder 13 is inserted into the inner cylinder insertion hole 16, and in order to operate the ignition switch in response to pivoting between the OFF position and the ON position, a front end part of the inner cylinder 13 along the insertion direction 14 extends through the partition wall 19 and penetrates into the switch housing hole 18.

Provided in the inner cylinder 13 is a key hole 21 into which the legitimate mechanical key 12 can be inserted. Furthermore, a full tumbler 22 is held at one position along the axial direction of the inner cylinder 13 so as to be switchable between a state in which it engages with the cylinder body 11 and a state in which engagement with the cylinder body 11 is released in response to the legitimate mechanical key 12 being inserted into the key hole 21. A pair of half tumblers 23 is held at each of a plurality of locations, for example four, spaced in the axial direction in front of the full tumbler 22 in the insertion direction 14 so as to be switchable between a state in which they engage with the cylinder body 11 and a state in which engagement with the cylinder body 11 is released in response to the legitimate mechanical key 12 being inserted into the key hole 21.

Figure 4:
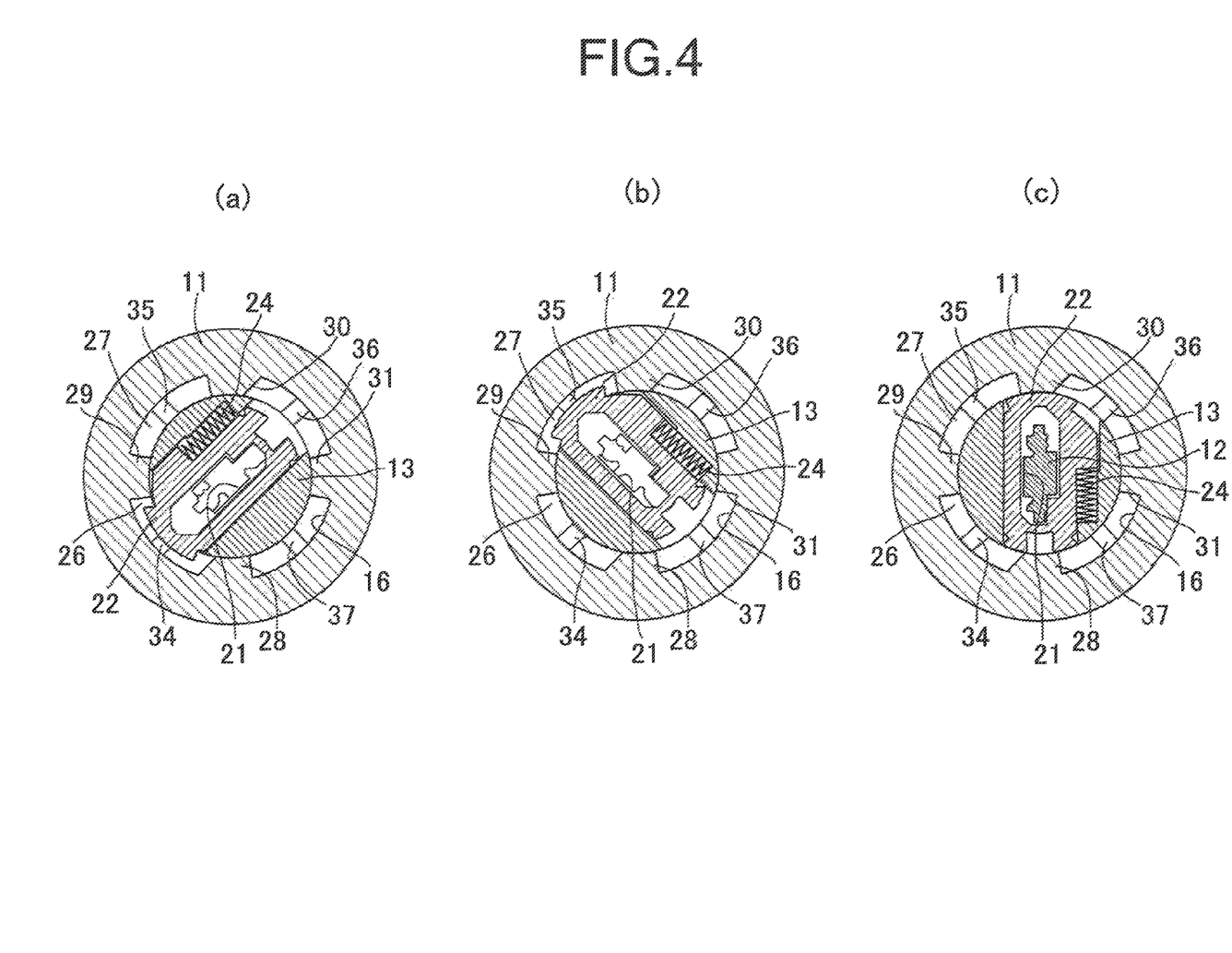
FIG. 4 is a sectional view along line 4-4 in FIG. 2 showing (a) a LOCK position, (b) an OFF position and (c) an ON position. (first embodiment)

Referring in addition to FIG. 4, the full tumbler 22 is held on the inner cylinder 13 so as to be capable of sliding in a direction orthogonal to the axis of the inner cylinder 13, and a spring 24 exhibiting a spring force that urges one end part of the full tumbler 22 along the sliding direction toward the side on which it projects from the outer periphery of the inner cylinder 13 is provided between the full tumbler 22 and the inner cylinder 13.

When the inner cylinder 13 is at the LOCK position in a state in which the mechanical key 12 is pulled out of the key hole 21, as shown in FIG. 4 (*a*), one end part of the full tumbler 22 projects from the outer periphery of the inner cylinder 13, and first and second ribs 28 and 29 projecting in a radially inward direction from the inner cylinder insertion hole 16 so as to form therebetween a latching recess 26 with which the full tumbler 22 is engaged in the above state extend in the axial direction of the inner cylinder insertion hole 16 and are provided integrally with the cylinder body 11.

Furthermore, provided integrally with the cylinder body 11 are a third rib 30 that is symmetrical to the first rib 28 with respect to the axis of the inner cylinder insertion hole 16 and a fourth rib 31 that is symmetrical to the second rib 29 with respect to the axis of the inner cylinder insertion hole 16, the third rib 30 and the fourth rib 31 being in sliding contact with the outer periphery of the inner cylinder 13 and supporting the inner cylinder 13 together with the first and second ribs 28 and 29. Formed between the second and third ribs 29 and 30 is a latching recess 27 with which one end part of the full tumbler 22 projecting from the outer periphery of the inner cylinder 13 as shown in FIG. 4 (*b*) is engaged when the inner cylinder 13 is at the OFF position in a state in which the mechanical key 12 is pulled out of the key hole 21.

Moreover, when the legitimate mechanical key 12 is inserted into the key hole 21 at the LOCK position or the OFF position, the full tumbler 22 attains a state in which one end part thereof is housed on the inner cylinder 13 side, and in this state the inner cylinder 13 can be pivoted to the ON position as shown in FIG. 4 (*c*).

Figure 5:
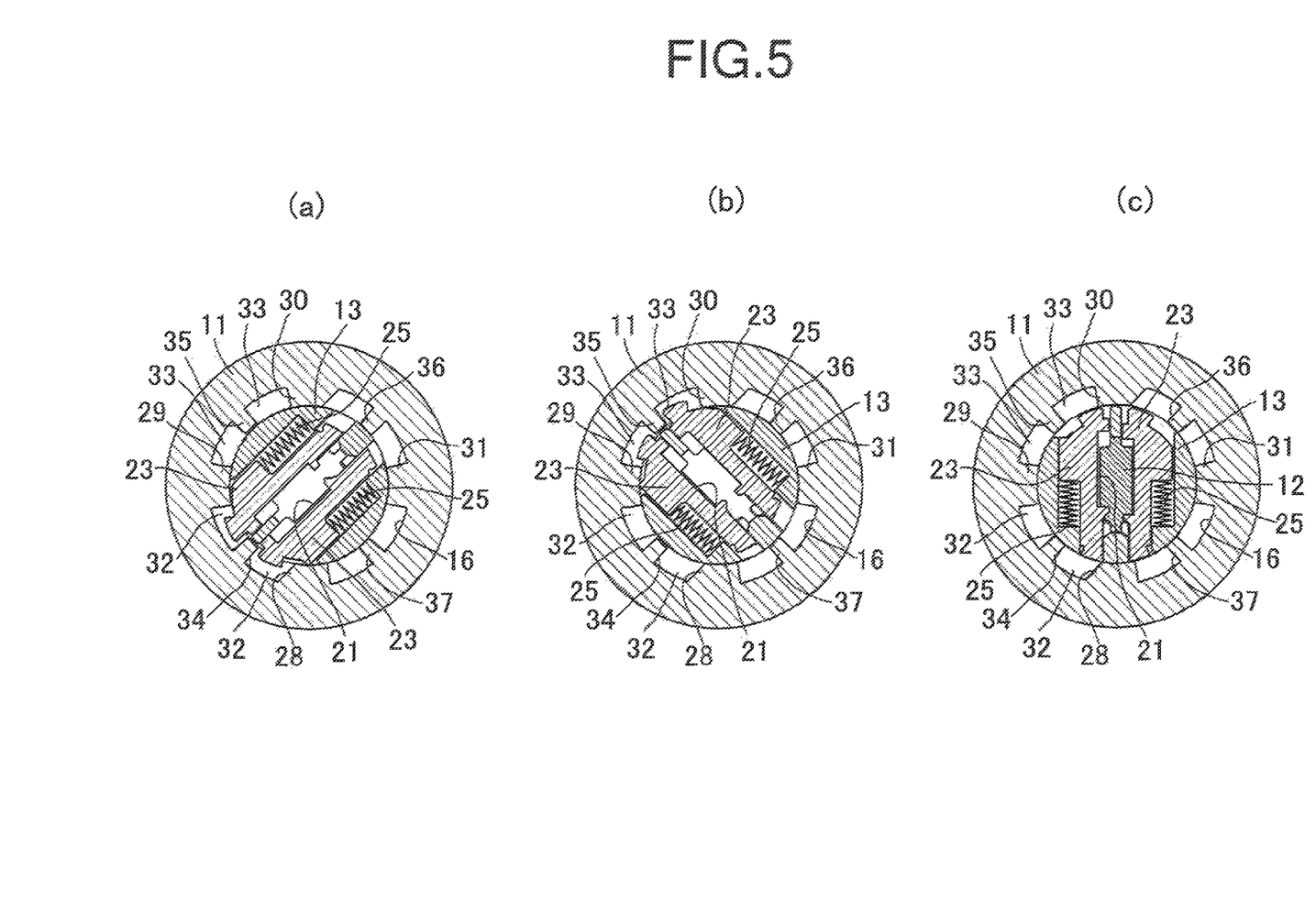
FIG. 5 is a sectional view along line 5-5 in FIG. 2 showing (a) a LOCK position, (b) an OFF position and (c) an ON position. (first embodiment)

In FIG. 5, the half tumblers 23 and 23, which form a pair, are held on the inner cylinder 13 so as to be capable of sliding in a direction orthogonal to the axis of the inner cylinder 13, and springs 25 and 25 exhibiting a spring force urging one end part, along the sliding direction, of the half tumblers 23 and 23 toward the side on which it projects from the outer periphery of the inner cylinder 13 are provided between each of the half tumblers 23 and 23 and the inner cylinder 13.

When the inner cylinder 13 is at the LOCK position in a state in which the mechanical key 12 is pulled out of the key hole 21, as shown in FIG. 5 (*a*), one end part of the half tumblers 23 and 23 projects from the outer periphery of the inner cylinder 13, and a fifth rib 34 projecting from the inner cylinder insertion hole 16 in a radially inward direction in a middle part between the first and second ribs 28 and 29 so as to form between itself and the first and second ribs 28 and 29 latching recesses 32 and 32 with which the half tumblers 23 and 23 are engaged in the above state extends in the axial direction of the inner cylinder insertion hole 16 and is provided integrally with the cylinder body 11.

Also when the inner cylinder 13 is at the OFF position in a state in which the mechanical key 12 is pulled out of the key hole 21, as shown in FIG. 5 (*b*), one end part of the half tumblers 23 and 23 projects from the outer periphery of the inner cylinder 13, and a sixth rib 35 projecting from the inner cylinder insertion hole 16 in a radially inward direction in a middle part between the second and third ribs 29 and 30 so as to form between itself and the second and third ribs 29 and 30 latching recesses 33 and 33 with which one end part of each of the half tumblers 23 and 23 is engaged in this state extends in the axial direction of the inner cylinder insertion hole 16 and is provided integrally with the cylinder body 11.

Furthermore, a seventh rib 36 that is symmetrical to the fifth rib 34 with respect to the axis of the inner cylinder insertion hole 16 and an eighth rib 37 that is symmetrical to the sixth rib 35 with respect to the axis of the inner cylinder insertion hole 16 are provided integrally with the cylinder body 11 so as to be in sliding contact with the outer periphery of the inner cylinder 13 and support the inner cylinder 13 together with the first to fourth ribs 28 to 31 and the fifth and sixth ribs 34 and 35. The seventh rib 36 is disposed in a middle part between the third and fourth ribs 30 and 31, and the eighth rib 37 is disposed in a middle part between the fourth and first ribs 31 and 28.

Moreover, when the legitimate mechanical key 12 is inserted into the key hole 21 at the LOCK position or the OFF position, the half tumblers 23 and 23 attain a state in which one end part thereof is housed on the inner cylinder 13 side, and in this state the inner cylinder 13 can be pivoted to the ON position as shown in FIG. 5 (c).

Figure 6:
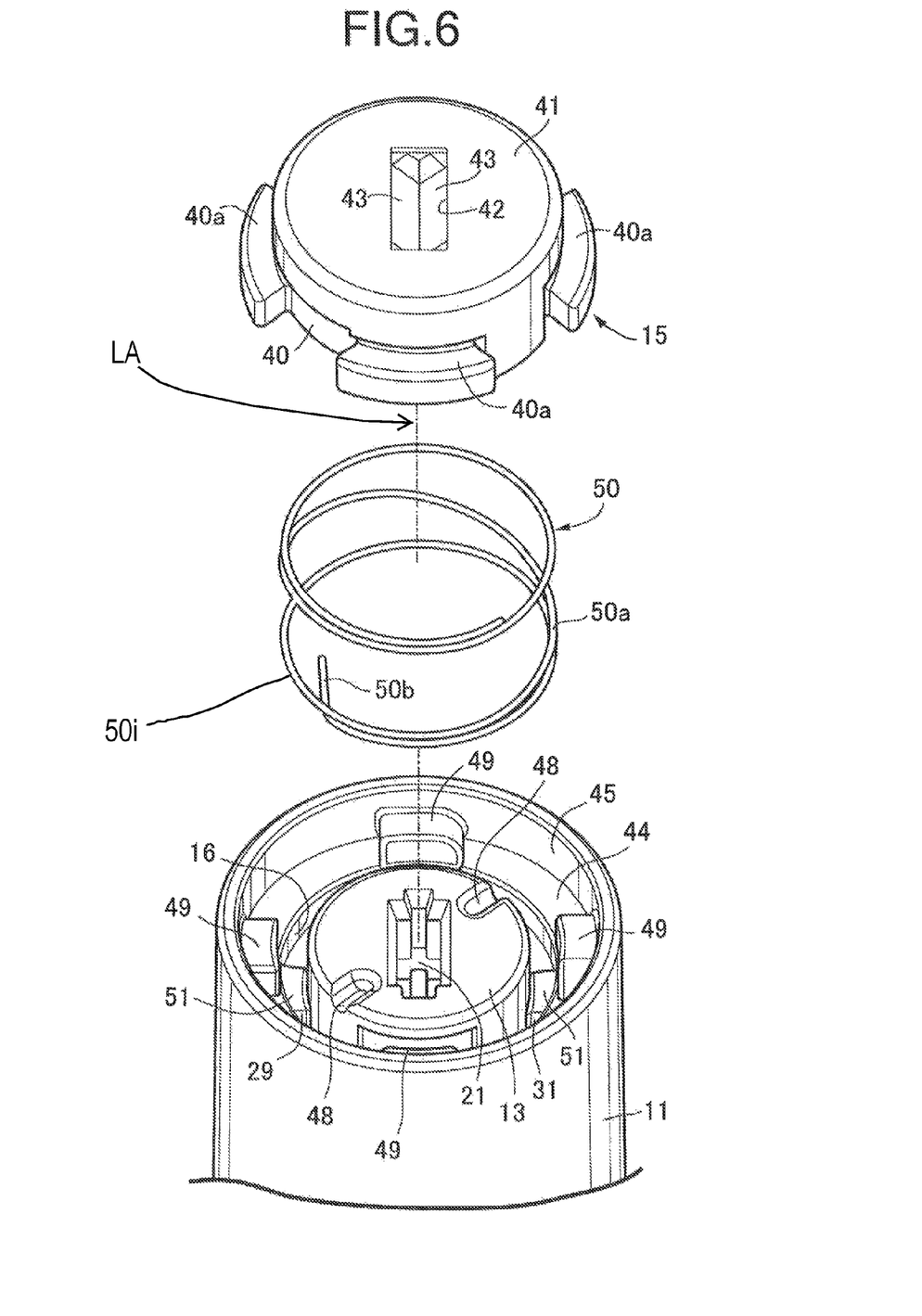
FIG. 6 is an exploded perspective view of the cylinder body, the inner cylinder, a protector and a spring. (first embodiment)
Figure 7:
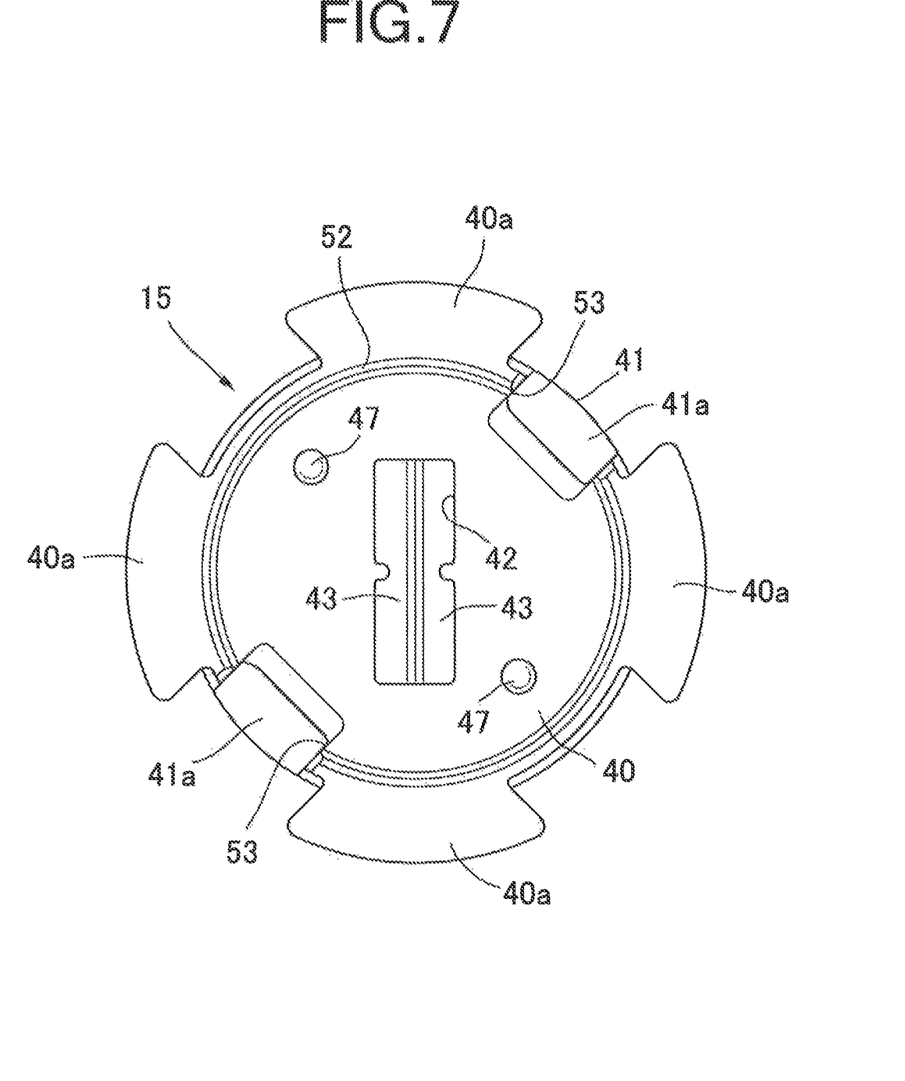
FIG. 7 is a view of the protector from the direction of arrowed line 7-7 in FIG. 2. (first embodiment)

Referring in addition to FIG. 6 and FIG. 7, the protector 15 is formed from a protector main body 40 having provided on the outer periphery a plurality of, for example four, engagement projecting portions 40a, and a cap 41 mounted on the protector main body 40 so as to cover an end part, on the side opposite to the inner cylinder 13, of the protector main body 40.

The protector main body 40 is formed into a short columnar shape so that part thereof can be inserted into a rear end part, along the insertion direction 14, of the inner cylinder insertion hole 16 of the cylinder body 11, the engagement projection portions 40a being projectingly provided integrally with a plurality of locations (four locations in this embodiment) spaced in the peripheral direction on the outer periphery of the protector main body 40.

A key insertion hole 42 is provided in the protector main body 40 and the cap 41 of the protector 15 so as to correspond to the key hole 21 of the inner cylinder 13, the legitimate mechanical key 12 being inserted into the key insertion hole 42 to the inner cylinder 13 side, and a pair of inner covers 43 and 43 are held on the protector main body 40 so that they open in response to the legitimate mechanical key 12 being inserted into the key insertion hole 42 but are urged to the closed side.

Formed at the rear end part, along the insertion direction 14, of the cylinder body 11 is a large diameter insertion hole 45 communicating coaxially with the inner cylinder insertion hole 16 via an annular step part 44 opposing the engagement projection portion 40a of the protector 15 from the front along the insertion direction 14 so that a front part, along the insertion direction 14, of the protector 15, including the engagement projection portion 40a, is inserted through the large diameter insertion hole 45.

On the other hand, a body cover 46 having an inward collar portion 46a opposing the engagement projection portion 40a from the side opposite to the annular step part 44 is mounted on the cylinder body 11 so as to cover part of the cylinder body 11. The protector 15 can move between a backward position at which the engagement projection portion 40a abuts against the inward collar portion 46a of the body cover 46, and a forward position at which the engagement projection portion 40a abuts against the annular step part 44.

Furthermore, the inner cylinder 13 is urged rearward along the insertion direction 14 by means of a spring (not illustrated) provided between itself and the cylinder body 11, in a normal state the rear end of the inner cylinder 13 abutting against the protector 15.

Moreover, in order to correctly determine the relative position between the key insertion hole 42 and the key hole 21, a pair of positioning projections 47 and 47 are projectingly provided on an end face, opposing the inner cylinder 13, of the protector main body 40 of the protector 15 as clearly shown in FIG. 7, and a pair of positioning recesses 48 and 48 are formed in an end face of the inner cylinder 13 opposing the protector 15, the positioning projections 47 and 47 being fitted into the positioning recesses 48 and 48.

Furthermore, four latching projections 49 with which each of the engagement projection portions 40a of the protector 15 is engaged in a state in which the protector 15 is moved to the forward position are provided on the cylinder body 11 projectingly from the annular step part 44 so as to be connected to the inner periphery of the large diameter insertion hole 45, and these latching projections 49 do not engage with the engagement projection portion 40a in a state in which the protector 15 is at the backward position. That is, when the protector 15 is forcibly pushed in by means of an unauthorized tool such as a screwdriver, the engagement projection portion 40a engages with the latching projection 49, thus preventing the protector 15 from pivoting.

A coil-shaped spring 50 is provided between the cylinder body 11 and the protector 15, the coil-shaped spring 50 extending in the axial direction of the inner cylinder 13 so as to urge the protector 15 to the backward position side. One end part of the spring 50 is received by a flat spring receiving seat 51 formed on an end part, on the protector 15 side, of each of the first to fourth ribs 28 to 31 of the cylinder body 11, and the first to fourth ribs 28 to 31 are formed so as to be longer on the protector 15 side than the fifth to eighth ribs 34 to 37. Furthermore, the other end part of the spring 50 is received by the protector main body 40 of the protector 15, and an annular spring receiving part 52 is provided on the protector main body 40 so as to receive the other end part of the spring 50, part of the spring receiving part 52 being formed by a front face, along the insertion direction 14, of a part where the engagement projection portion 40a is connected to the protector main body 40.

Recesses 53 and 53 dividing the peripheral direction of the spring receiving part 52 into two parts are provided in the protector main body 40, bent engagement claws 41a and 41a formed integrally with the cap 41 are engaged with the recesses 53 and 53, and the cap 41 is thereby mounted on the protector main body 40.

In accordance with the present invention, as clearly shown in FIG. 6, the coil-shaped spring 50 is formed so as to have a coil portion 50a extending in the axial direction of the inner cylinder 13 and a bent portion 50b bent toward the interior of the coil portion 50a in a direction along a line which is substantially parallel to the axis of the inner cylinder 13 from an inner end part 50i of the coil portion 50a. In this embodiment, the spring 50 is formed so as to have the bent portion 50b connected to the inner end part 50i, on the cylinder body 11 side, of the coil portion 50a, and the bent portion 50b may extend axially outwardly from the inner end part 50i of the coil portion 50a, as shown. The bent portion 50b of the coil spring is configured such that it does not interfere with the outer periphery of the inner cylinder 13 when the inner end part 50i of the coil portion 50a is received by the spring receiving seat 51 of the first to fourth ribs 28 to 31.

The body cover 46 closes the housing recess 17 of the cylinder body 11 and forms an operating chamber 54 between itself and the cylinder body 11, a slide member 55 moving in a direction orthogonal to the axis of the inner cylinder 13 in response to pivoting of the inner cylinder 13 between the LOCK position and the OFF position is housed in the operating chamber 54, and a lock pin 56 that engages with the head pipe of the two-wheeled motor vehicle to attain a steering locked state is slidably fitted into the cylinder body 11 and operatively linked to the slide member 55.

The operation of this first embodiment is now explained; the coil-shaped spring 50 extending in the axial direction of the inner cylinder 13 is provided between the protector 15 and the spring seat 51, defined by the outer surfaces of the first to fourth ribs 28 to 31 of the cylinder body 11. The spring 50 is configured and arranged to exhibit a spring force urging the protector 15 rearward (outwardly) along the insertion direction 14. This spring 50 is formed so as to have the coil portion 50a extending in the axial direction of the inner cylinder 13, and the bent portion 50b disposed at the interior of the coil portion 50a and extending, in a direction along a line which is substantially parallel to the longitudinal axis LA (FIG. 6) of the inner cylinder 13 from the inner end part 50i, on the cylinder body 11 side, of the coil portion 50a. It will therefore be seen that, even if the spring 50 pivots together with the protector 15, when the protector 15 and the inner cylinder 13 pivot, the inner end side 50i of the spring 50 does not engage with the side portions of the first to fourth ribs 28 to 31 of the cylinder body 11, and therefore, no force acts on the spring 50 to deform it, thereby enabling deformation of the spring 50 to be prevented.

Second Embodiment

Figure 8:
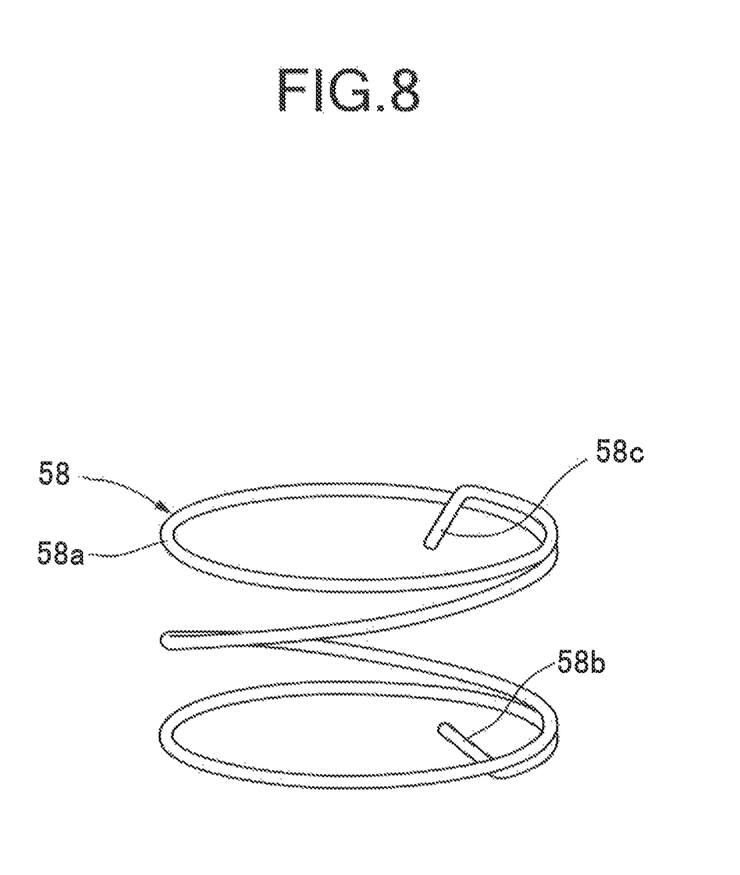
FIG. 8 is a perspective view of a spring of a second embodiment. (second embodiment)

In accordance with a second embodiment of the present invention, a coil-shaped spring 58 shown in FIG. 8 may be used between a protector 15 and first to fourth ribs 28 to 31 of a cylinder body 11 instead of the spring 50, this spring 58 being formed from a coil portion 58a and bent portions 58b and 58c bent toward the interior of the coil portion 58a in a direction along the axis from opposite end parts of the coil portion 58a, and the same effects as those of the first embodiment can be exhibited even using such a spring 58.

Embodiments of the present invention are explained above, but the present invention is not limited to the above embodiments and may be modified in a variety of ways as long as the modifications do not depart from the spirit and scope thereof.

For example in the embodiments above the springs 50 and 58 are provided between the cylinder body 11 and the protector 15, but they may be provided between the inner cylinder 13 and the protector 15.

The invention claimed is:

1. A cylinder locking device in which
an inner cylinder is inserted into a cylinder body and is pivotally movable therein, the inner cylinder having an axis,
a tumbler, whose engagement with the cylinder body is configured to be released in response to a legitimate mechanical key being inserted thereinto, is held by the inner cylinder,
a protector is disposed in the cylinder body opposite a rear end of the inner cylinder along an the mechanical key to be inserted toward the inner cylinder,
and a coil-shaped spring, extending in an axial direction of the inner cylinder, is provided between the protector and the inner cylinder or the cylinder body, the spring arranged so as to exhibit a spring force urging the protector outwardly along the insertion direction,
wherein the spring comprises a coil portion, that extends in the axial direction of the inner cylinder, and a bent portion that is disposed inside of the coil portion and extends from at least one end part of the coil portion along a line which is substantially parallel to a longitudinal axis of the inner cylinder.

2. The cylinder locking device of claim 1, wherein the cylinder locking device is configured such that the spring may be pivotally moved in the cylinder body without any interfering contact between the bent portion of the spring and the cylinder body.

3. The cylinder locking device of claim 1, wherein a plurality of positioning recesses are formed in an outwardly-facing surface of the inner cylinder, and a plurality of positioning projections are formed on an inwardly-facing surface of the protector, the positioning projections being alignable with the positioning recesses of the inner cylinder.

4. A cylinder locking apparatus, comprising a cylinder body, an inner cylinder, a tumbler, a protector, and an inner spring, wherein:
the inner cylinder is disposed inside of the cylinder body and is pivotally movable therein,
the tumbler, whose engagement with the cylinder body is configured to be released in response to a legitimate mechanical key being inserted thereinto, is held by the inner cylinder,
the protector is disposed in the cylinder body outside of the inner cylinder, the protector having an opening formed therein for receiving a shaft of the mechanical key,
and the inner spring is provided between the protector and the cylinder body, the spring being coil-shaped and arranged to bias the protector outwardly,
the spring comprises a coil portion, that extends in an axial direction of the inner cylinder, and a bent portion that is bent from an end part of the coil portion in a direction substantially parallel to longitudinal axis of the inner cylinder,
and the cylinder locking apparatus is configured such that the spring may be pivotally moved in the cylinder body without any interfering contact between the bent portion of the spring and the cylinder body.

5. The cylinder locking device of claim 4, wherein a plurality of positioning recesses are formed in an outwardly-facing surface of the inner cylinder, and a plurality of positioning projections are formed on an inwardly-facing surface of the protector, the positioning projections being alignable with the positioning recesses of the inner cylinder.

* * * * *